United States Patent [19]

Orain

[11] Patent Number: 4,501,571
[45] Date of Patent: Feb. 26, 1985

[54] LARGE OPERATING ANGLE CONSTANT-SPEED JOINT

[75] Inventor: Michel A. Orain, Conflans Sainte Honorine, France

[73] Assignee: Glaenzer Spicer, Poissy, France

[21] Appl. No.: 473,435

[22] Filed: Mar. 9, 1983

[30] Foreign Application Priority Data

Mar. 15, 1982 [FR] France .................................. 82 04323

[51] Int. Cl.³ ............................ F16D 3/16; F16D 3/26
[52] U.S. Cl. .................................... 464/111; 464/106; 464/132; 464/134
[58] Field of Search ................ 464/106, 110, 111, 147, 464/905, 904, 112, 125, 126, 132, 134, 135

[56] References Cited

U.S. PATENT DOCUMENTS

| | | | |
|---|---|---|---|
| 1,181,902 | 5/1916 | Lessert et al. | |
| 2,086,549 | 7/1937 | Harris | 464/106 |
| 3,001,621 | 9/1961 | Burns | |
| 3,347,214 | 10/1967 | Plagmann | 464/106 X |
| 3,712,081 | 1/1973 | Philipp et al. | |
| 3,877,251 | 4/1975 | Wahlmark | 464/132 X |
| 4,192,154 | 3/1980 | Nakamura et al. | 464/132 X |
| 4,379,706 | 4/1983 | Otsuka et al. | 464/132 X |

FOREIGN PATENT DOCUMENTS

| | | |
|---|---|---|
| 979086 | 4/1951 | France ............................. 464/106 |
| 1011802 | 6/1952 | France ............................. 464/905 |
| 1596282 | 7/1970 | France . |
| 215802 | 7/1941 | Switzerland . |
| 235899 | 12/1944 | Switzerland . |
| 2073369 | 10/1981 | United Kingdom . |

*Primary Examiner*—Stuart S. Levy
*Assistant Examiner*—Thomas R. Hannon
*Attorney, Agent, or Firm*—Wenderoth, Lind & Ponack

[57] ABSTRACT

A constant speed joint differs from the prior art in particular by the fact that it does not include rolling members. The joint includes a bell element, a spider element and three yokes which are mounted, on one hand, at the ends thereof on the bell element to pivot about first axes and, on the other hand, in the central part thereof, on the spider element by means of double pivotal mountings allowing pivotal motion about second and third axes, the pivotal mounting having the third axis also allowing a sliding motion.

12 Claims, 9 Drawing Figures

LARGE OPERATING ANGLE CONSTANT-SPEED JOINT

The present invention relates to constant-speed joints having a large angle of operation.

BACKGROUND OF THE INVENTION

Known large-angle constant-speed joints designed for driving the driving and steering wheels of front-wheel drive automobile vehicles, usually comprise rolling elements which transfer the driving forces by pressure exerted by their surfaces on tracks. This pressure of contact, termed "Hertz", becomes very high principally when these joints operate at a large angle, since the direction of the pressing forces is off centre relative to the plane of symmetry of the tracks. Thus, the pressure of contact produces under the pressed surface shear stresses which exceed the strength of the treated steels so that the allowable torque at the maximum angle of operation is limited. The possibility of a high torque at an operating angle is required, in particular in the case of a critical starting, for example for getting a vehicle out of a bogged situation with the steering turned through the full lock.

SUMMARY OF THE INVENTION

An object of the invention is to provide a solution to this problem by providing a constant-speed joint which does not employ the principle of the Hertz pressures and preserves its nominal capacity at a large angle of operation. This is achieved in a joint for interconnecting in a constant-speed manner two shafts having axes X-X and Y-Y respectively, this joint comprising two elements respectively rigid with the two shafts and disposed coaxially therewith, wherein the two elements are interconnected by yokes. Each yoke is mounted, on one hand, on one of the elements to pivot about an axis perpendicular to the axis of this element, and, on the other hand, on the other of the elements by a double pivotal mounting and by a sliding connection slidable along an axis perpendicular to the axis of the other element.

According to other features the invention:

the double pivotal mounting comprises a connection rotatable about a first axis parallel to the axis of the associated element and a second connection rotatable about a second axis intersecting the first axis and perpendicular to the axis of the associated element;

one of the two elements has the shape of a bell and the other the shape of a spider;

according to one embodiment, three yokes are provided, each yoke being mounted, on one hand, at both ends thereof, on the bell element to pivot about an axis perpendicular to the axis of the bell element and, on the other hand, in the median part thereof, on one of the branches of a spider element having three branches, by means of the double pivotal mounting and the sliding connection;

according to another embodiment, three yokes are provided, each yoke being pivotally mounted, on one hand, at both ends thereof, on two diametrically opposed branches of a spider element having six branches and, on the other hand, in the median part thereof, on the bell element by means of the double pivotal mounting and the sliding connection.

BRIEF DESCRIPTION OF THE DRAWINGS

The invention will be described in more detail hereinafter with reference to the accompanying drawings which are given solely by way of examples and in which.

DETAILED DESCRIPTION OF THE INVENTION

Figure 1:
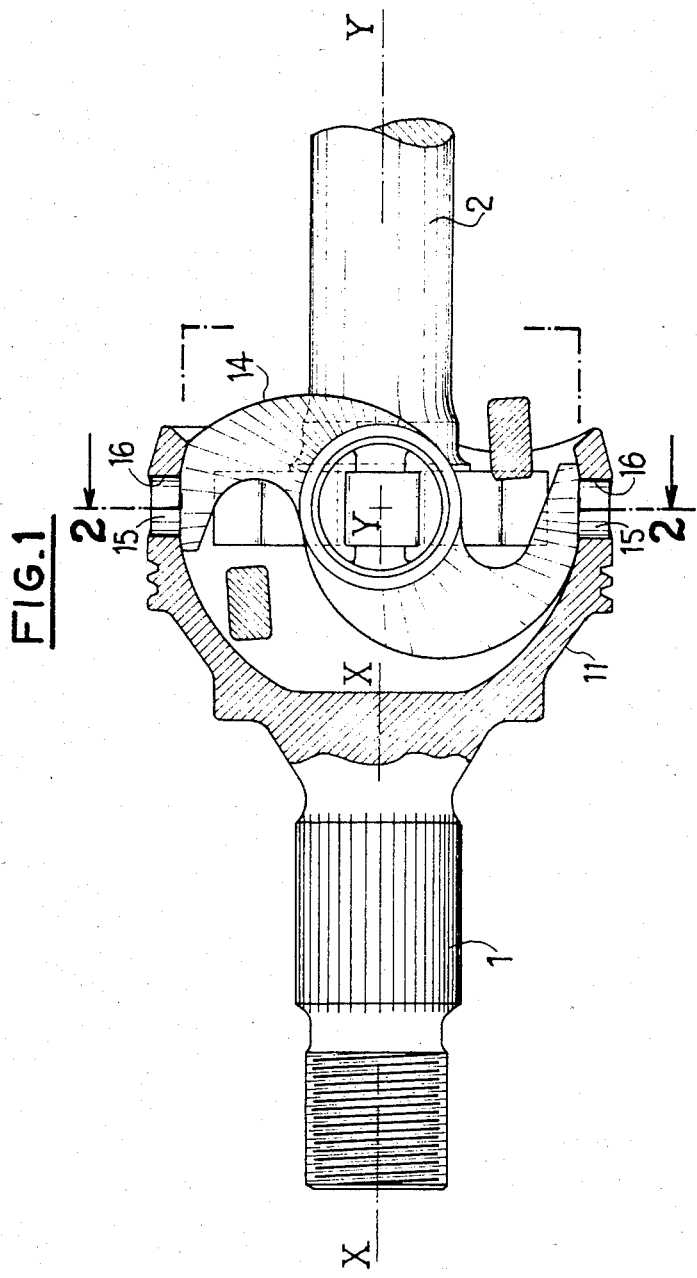
FIG. 1 is a side elevational view, with a part cut away and partly in section, of a constant-speed joint according to the invention.

FIG. 1 shows two shafts 1, 2 having axes X-X and Y-Y respectively, and being in alignment in the illustrated position. According to one application, the shaft 1 may constitute a stubaxle carrying a driving and steering wheel (not shown), and the shaft 2 constitutes a transmission shaft connected to an engine-drive unit.

Disposed between these two shafts is a constant-speed joint according to the invention. This joint comprises a bell element 11 rigid with the shaft 1, or fixed to the latter, and also having the axis X-X. The shaft 2 carries a spider element 12 having three branches 13 which are disposed angularly 120° apart and extend in a radial plane relative to the axis Y-Y. The centre of the spider element is located on the axis Y-Y.

Figure 2:
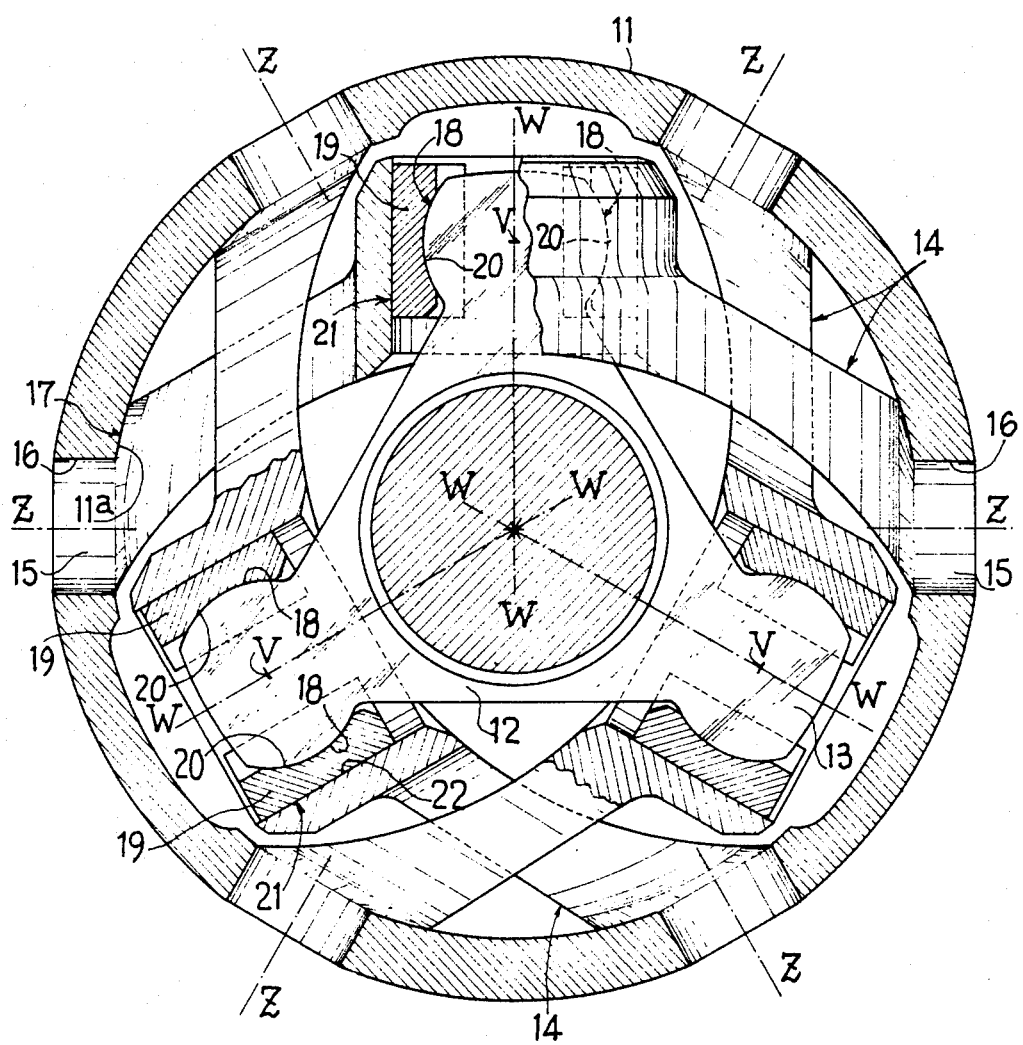
FIG. 2 is a sectional view taken along line 2—2 of FIG. 1, some parts of which have been broken away.
Figure 3:
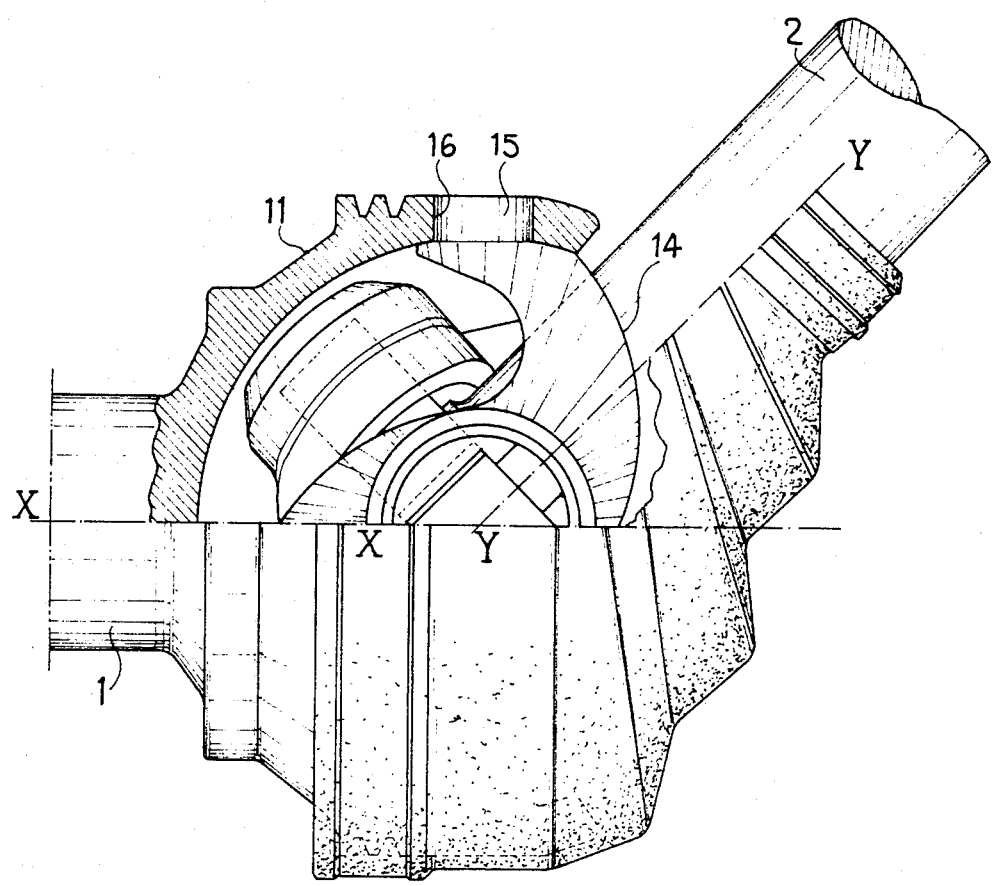
FIG. 3 is an elevational view, with parts cut away, of the joint operating at an angle.

The spider element and the bell element are interconnected by three yokes 14 whose relatively complex shape can be seen in FIGS. 1 and 2. Each yoke is pivotally mounted at the ends thereof by means of two trunnions 15 received in diametrically opposed bores 16 defined in the bell element. Each yoke is therefore mounted on the bell element to pivot about an axis Z-Z perpendicular to the axis X-X, the three axes Z-Z being concurrent and making therebetween angles of 60°. Each yoke comprises, in the vicinity of its two pivotal mounting trunnions, bearing surfaces 17 which are planar or spherical and are in contact with the inner wall 11a of the bell element.

Each yoke is pivotally mounted, by the median part thereof, on one of the branches of the spider element. For this purpose, each branch 13 comprises, at the end thereof, a cylindrical surface 18 which has an axis V-V parallel to the axis Y-Y and carries two semi-bearing bushes 19 defining a cylindrical inner surface 20 corresponding to the cylindrical surface of the spider element and an outer surface 21 which is also cylindrical but has a radial axis W-W perpendicular to the axes V-V and Y-Y and cooperates with a bore 22 provided in the associated yoke. The surfaces 21 and 22 also constitute a connection slidable along the axis W-W.

As viewed in FIG. 1, the yokes have a generally S shape and have an imbricated disposition, their shape being adapted to allow the movements of the joint throughout the angular operating range of this joint, which may reach or exceed 50°.

Each yoke is therefore connected to the bell element 11 by a pivotal mounting allowing a pivotal motion of the yoke about the axis Z-Z perpendicular to the axis X-X of the bell element. It is moreover connected to the spider element 12 by a double pivotal mounting for pivotal motion respectively about the axis V-V parallel to the axis Y-Y of the spider element and about the radial axis W-W perpendicular to the axis Y-Y, with interposition of the bearing bush 19. Moreover, there is provided between each yoke and the associated branch of the spider element a connection allowing sliding motion along the last-mentioned radial axis W-W.

With such an arrangement, the angular motion of the spider element 12, and consequently of the shaft 2, is allowed relative to the bell element 11 and to the shaft 1, in any direction, but any axial displacement of the shaft 2 and of the spider element is prevented relative to the assembly comprising the bell element and the shaft 1. Further, in every operating circumstance, the radial plane containing the branches of the spider element contains the point of concurrence of the three axes Z-Z of the bores formed in the bell element, so that the shaft 2 and the spider element are axially fixed in position relative to the bell element. Indeed, the axis of each pair of surfaces 18, 20 perpendicular to the radial plane containing the branches of the spider element, remains constantly perpendicular to the axis W-W of the central bore of the yoke 22 which passes through the point of concurrence of the axes Z-Z of the bores 16 of the bell element.

In this arrangement, the driving torque is transmitted from the shaft 2 through the spider element 12 to the bearings 19 and then to the yokes 14 and the bell element 11, the bearings 19 being free to pivot about the axes V-V and rotate and slide in the bores 22 of the yokes 14. The latter are pivotable relative to the bell element about the axes Z-Z.

Figure 4:
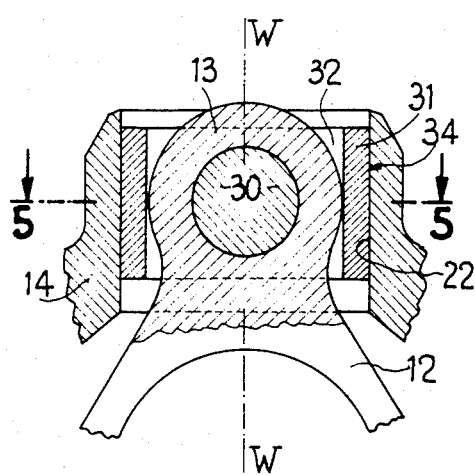
FIG. 4 is a detail view of a modification.
Figure 5:
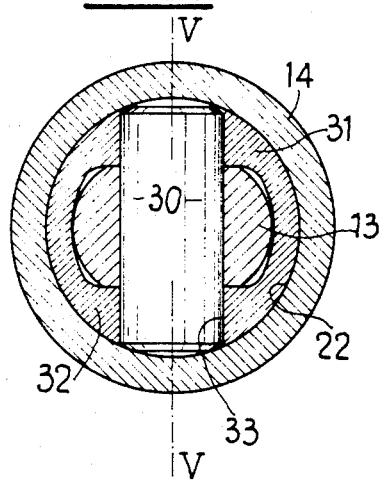
FIG. 5 is a sectional view taken along line 5—5 of FIG. 4.

FIGS. 4 and 5 show a first modification of the connection between each yoke 14 and the associated branch 13 of the spider element 12. According to this modification, each branch of the spider element carries a pin 30 which is parallel to the axis Y-Y and on which is pivotally mounted a bearing bush 31 which has a cavity for receiving the end portion of the branch of the spider element and includes, in the two opposed sides 32 thereof, bores 33 receiving the pin 30. This bearing bush has a cylindrical outer wall 34 and is received in the bore 22 of the yoke and is axially slidable in this bore.

Figure 6:
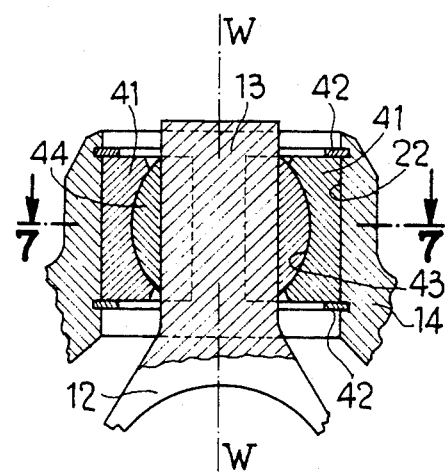
FIG. 6 is a detail view of another modification.
Figure 7:
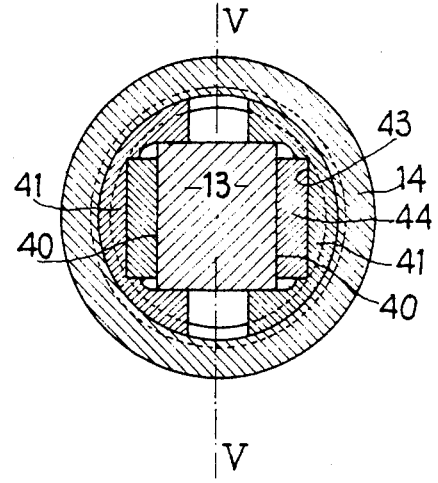
FIG. 7 is a sectional view taken along line 7—7 of FIG. 6.

In the modification shown in FIGS. 6 and 7, the branches 13 of the spider element have a rectangular sectional shape. The sliding connection between each yoke and the corresponding branch of the spider element, which is slidable along the radial axis W-W perpendicular to the axis Y-Y, is achieved along two opposed surfaces 40 of these branches and two semi-bearing bushes 41 are provided and fixedly axially within the central bore 22 of each yoke by resiliently yieldable rings 42, circlips or other known means. The two semi-bearing bushes define in their surfaces 43 facing the branch of the spider element concave cylindrical recesses having an axis V-V parallel to the axis Y-Y and the pivotal motion of each semi-bearing bush is allowed by a member 44 which has a half-moon shape or a planar-convex shape, interposed between the adjacent surface 40 of the branch of the spider element and each semi-bearing bush 42.

Figure 8:
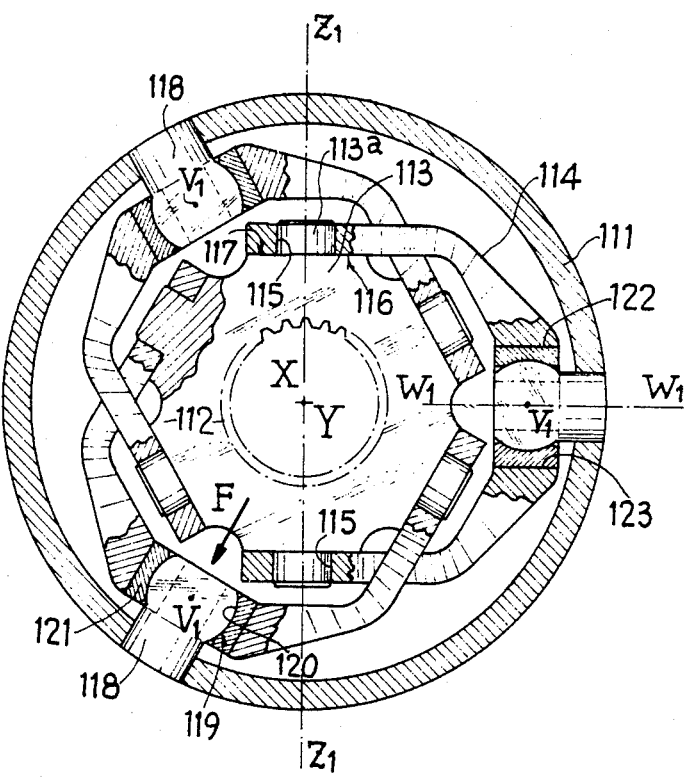
FIG. 8 is a view similar to FIG. 6 of another modification.
Figure 9:
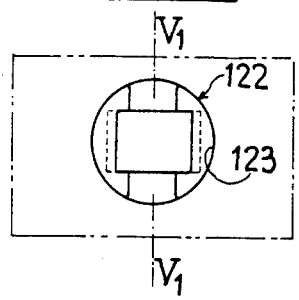
FIG. 9 is a view in the direction of arrow F of FIG. 8.

In the embodiment shown in FIGS. 8 and 9, the spider element 112 comprises six branches 113 disposed angularly 60° apart and each including a trunnion 113a. The trunnions of two diametrically opposed branches having an axis $Z_1$-$Z_1$ receive the end portions of the two branches of a yoke 114 which have for this purpose coaxial bores 115 and surfaces 116 bearing against complementary bearing surfaces 117 of the spider element. Each yoke is moreover pivotally mounted by the central part thereof on a pivot 118 carried by the bell element 111. The connection between the yoke and its pivot comprises a first pivotal mounting having an axis $V_1$-$V_1$ parallel to the axis X-X (FIG. 9) constituted by a cylindrical bearing surface 119 provided at the inner end of the pivot and cooperating with a cylindrical surface 120 of a bearing bush 121 and by a second pivotal mounting having a radial axis $W_1$-$W_1$ perpendicular to the axis X-X, this second pivotal mounting being provided by the cooperation of a cylindrical outer surface 122 of the bearing bush and a bore 123 provided in the yoke. The latter connection also constitutes a connection which is slidable along the radial axis $W_1$-$W_1$.

As before, the three yokes 114 are disposed in an imbricated manner and have a shape adapted to allow the operation of the joint at an angle.

In its various configurations, this joint operates without rolling elements and consequently without involving Hertz pressures, the drawbacks of which were explained in the introduction of this specification. Such a joint operates in a constant-speed manner and consequently effectively solves the considered problem.

Note that, as concerns the mounting, the bell element 11, 111 may advantageously be arranged in two parts and welded by an electronic bombardment after insertion of the yokes and the spider element.

Further, other embodiments of the pivotal mounting between the yokes and the bell element or the spider element may be proposed without departing from the scope of the invention defined in the claims. In particular, it is unnecessary to retain the spider element axially relative to the bell element, and one of the pivotal mountings, such as the mounting allowing pivotal motion about the axis V-V or $V_1$-$V_1$, may be formed by a spherical ball joint. In this case, the joint has a certain freedom to slide axially, or additional axial retaining means may be added thereto.

Having now described my invention what I claim as new and desire to secure by Letters Patent is:

1. A constant-speed joint for interconnecting two shafts and comprising:
    two elements, each said element being rigid and coaxial with a respective one of said shafts;
    a plurality of yokes interconnecting said two elements;
    means for mounting each said yoke on one of said elements to pivot about an axis perpendicular to the axis of said one element; and
    means for mounting each said yoke on the other of said element and comprising a double pivotal mounting and a slidable connection allowing a sliding motion along an axis perpendicular to the axis of said other element.

2. A constant-speed joint according to claim 1, wherein each double pivotal mounting comprises two mountings allowing rotation about two perpendicular concurrent axes.

3. A constant-speed joint according to claim 2, wherein said perpendicular concurrent axes of said rotatable mountings are respectively parallel to and perpendicular to said axis of said other element.

4. A constant-speed joint according to claim 3, wherein each double pivotable mounting comprises at least one bearing bush interposed between each yoke and said other element.

5. A constant-speed joint according to claim 3, wherein the rotatable mounting for rotation about an axis perpendicular to the axis of said other element also constitutes the slidable connection.

6. A constant-speed joint according to claim 1, wherein each double pivotal mounting comprises a ball joint and a pivotal mounting allowing rotation about an axis perpendicular to the axis of said other element.

7. A constant-speed joint according to claim 1, wherein one of said two elements has the shape of a bell and the other element has the shape of a spider.

8. A constant-speed joint according to claim 7, comprising three yokes, each yoke being mounted, adjacent two ends thereof, on the bell element to pivot about an axis perpendicular to the axis of the bell element and being mounted, in a median part thereof, on one of three branches of the spider element, by means of said double pivotal mounting and said slidable connection.

9. A constant-speed joint according to claim 8, wherein each yoke comprises, adjacent two ends thereof, trunnions received in diametrically opposed bores in the bell element, said bores having axes contained in a common radial plane perpendicular to the axis of the bell element and making angles of 60° between said bore axes.

10. A constant-speed joint according to claim 7, comprising three yokes, each yoke being pivotally mounted, adjacent two ends thereof, on two diametrically opposed branches of the spider element which has six branches, and mounted, in a median part thereof, on said bell element by means of the double pivotal mounting and said slidable connection.

11. A constant-speed joint according to claim 10, wherein the bell element carries three supports which project radially inwardly and on which supports said yokes are pivotally mounted.

12. A constant-speed joint according to claim 1, wherein the yokes have a generally S shape when viewed in a direction parallel to the axis of said slidable connection.

* * * * *